(12) United States Patent
Nakashima et al.

(10) Patent No.: US 11,033,878 B2
(45) Date of Patent: *Jun. 15, 2021

(54) AGENT FOR REMOVING HALOGEN GAS, METHOD FOR PRODUCING SAME, METHOD FOR REMOVING HALOGEN GAS WITH USE OF SAME, AND SYSTEM FOR REMOVING HALOGEN GAS

(71) Applicant: CLARIANT CATALYSTS (JAPAN) K.K., Tokyo (JP)

(72) Inventors: Tadahito Nakashima, Toyama (JP); Kenichiro Sunata, Toyama (JP); Yasushi Shioya, Toyama (JP); Hyun-Joong Kim, Toyama (JP)

(73) Assignee: CLARIANT CATALYSTS (JAPAN) K.K., Tokyo (JP)

( * ) Notice: Subject to any disclaimer, the term of this patent is extended or adjusted under 35 U.S.C. 154(b) by 29 days.

This patent is subject to a terminal disclaimer.

(21) Appl. No.: 16/483,556

(22) PCT Filed: Nov. 15, 2017

(86) PCT No.: PCT/JP2017/041090
§ 371 (c)(1),
(2) Date: Aug. 5, 2019

(87) PCT Pub. No.: WO2018/146888
PCT Pub. Date: Aug. 16, 2018

(65) Prior Publication Data
US 2020/0023336 A1 Jan. 23, 2020

(30) Foreign Application Priority Data
Feb. 7, 2017 (JP) .............................. JP2017-020456

(51) Int. Cl.
*B01J 20/08* (2006.01)
*B01D 53/68* (2006.01)
(Continued)

(52) U.S. Cl.
CPC ............ *B01J 20/08* (2013.01); *B01D 53/685* (2013.01); *B01D 53/82* (2013.01); *B01J 20/041* (2013.01);
(Continued)

(58) Field of Classification Search
CPC ........ B01J 20/08; B01J 20/041; B01J 20/045; B01J 20/06; B01J 20/28071;
(Continued)

(56) References Cited

U.S. PATENT DOCUMENTS

2007/0253879 A1* 11/2007 Sakurai .................... B01J 20/06
423/241
2010/0136234 A1* 6/2010 Kobayashi ............. B41M 5/506
427/256

FOREIGN PATENT DOCUMENTS

JP         H0727564 A      10/1995
JP         2001017831 A    1/2001
(Continued)

OTHER PUBLICATIONS

English Translation of JP 4913271 B2 (Year: 2012).*
(Continued)

*Primary Examiner* — Andrew J. Oyer
(74) *Attorney, Agent, or Firm* — Scott R. Cox

(57) ABSTRACT

An agent for removing a halogen gas, such as chlorine, in a waste gas by means of reduction; a method for producing this agent; a method for removing a halogen gas by use of this agent; and a system for removing a halogen gas. The agent for removing the halogen gas contains at least pseudo-boehmite, that serves as a host material, and a sulfur-
(Continued)

CONSTITUTION OF IMPROVED SYSTEM FOR REMOVING HALOGEN GAS containing reducing agent, that serves as a guest material. 1-8% by weight of the reducing agent, in terms of elemental sulfur, based on the total amount of the pseudo-boehmite and sulfur-containing reducing agent is present in the agent. At least one inorganic compound selected from among oxides, carbonates salts and hydrocarbon salts of alkaline earth metal elements, transition metal elements and zinc group elements is additionally contained in the agent as a third component.

19 Claims, 3 Drawing Sheets

(51) Int. Cl.
  *B01D 53/82* (2006.01)
  *B01J 20/04* (2006.01)
  *B01J 20/06* (2006.01)
  *B01J 20/28* (2006.01)
  *B01J 20/30* (2006.01)

(52) U.S. Cl.
  CPC ............ *B01J 20/045* (2013.01); *B01J 20/06* (2013.01); *B01J 20/28071* (2013.01); *B01J 20/28073* (2013.01); *B01J 20/28083* (2013.01); *B01J 20/28085* (2013.01); *B01J 20/3007* (2013.01); *B01J 20/3014* (2013.01); *B01D 2251/20* (2013.01); *B01D 2253/104* (2013.01); *B01D 2253/1124* (2013.01)

(58) Field of Classification Search
  CPC ............ B01J 20/28073; B01J 20/28083; B01J 20/28085; B01J 20/3007; B01J 20/3014; B01J 20/04; B01J 20/18; B01J 20/28; B01J 20/30; B01D 53/685; B01D 53/82; B01D 2251/20; B01D 2253/104; B01D 2253/1124; B01D 53/02; B01D 2257/302; B01D 2258/0216; B01D 2257/55; B01D 2257/204; B01D 2257/2022; B01D 53/508; B01D 2251/404; B01D 2251/604; B01D 2253/108; B01D 2253/311; B01D 2255/20792; B01D 2257/2047; B01D 2257/2042; B01D 2257/2045; B01D 2257/2027; B01D 2257/2025; B01D 2253/102; B01D 2251/304; B01D 2251/602; B01D 2251/606; B01D 2253/308; B01D 2251/402; B01D 2251/608

See application file for complete search history.

(56) References Cited

FOREIGN PATENT DOCUMENTS

| | | |
|---|---|---|
| JP | 2004249285 A | 9/2004 |
| JP | 2005177576 A | 7/2005 |
| JP | 4913271 B2 * | 4/2012 |

OTHER PUBLICATIONS

English Translation of International Search Report of the International Searching Authority, dated Feb. 2, 2018, with respect to International Application No. PCT/JP2017/041090.

English Translation of International Preliminary Report on Patentability of the International Searching Authority, dated Aug. 13, 2019, with respect to International Application No. PCT/JP2017/041090.

* cited by examiner

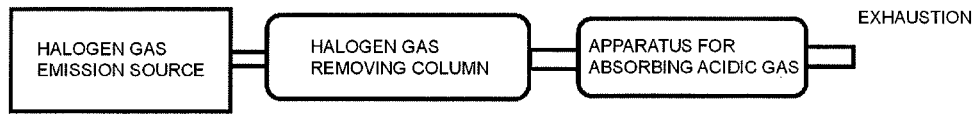
FIG. 1 CONSTITUTION OF IMPROVED SYSTEM FOR REMOVING HALOGEN GAS
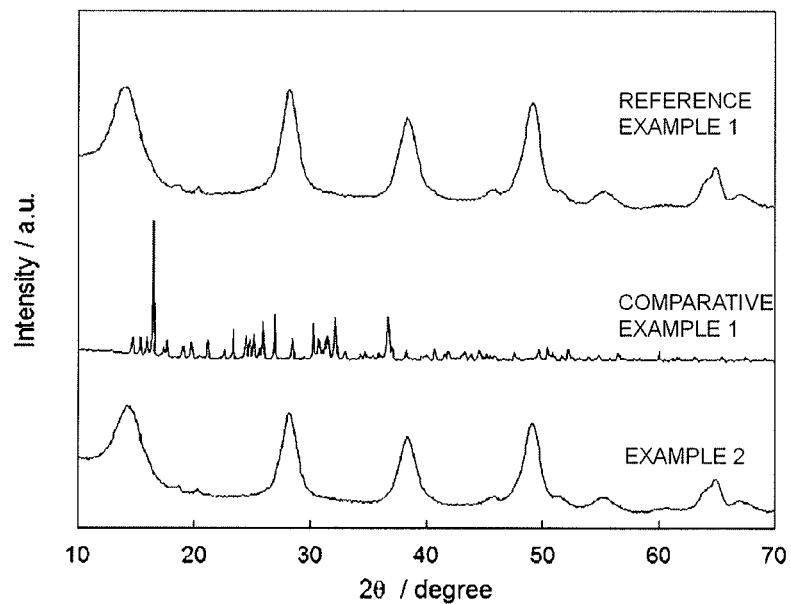
FIG. 2 XRD PATTERNS OF EXAMPLE 2 (PSEUDOBOEHMITE/SODIUM THIOSULFATE PENTAHYDRATE), REFERENCE EXAMPLE 1 (PSEUDOBOEHMITE) AND COMPARATIVE EXAMPLE 1 (SODIUM THIOSULFATE PENTAHYDRATE)

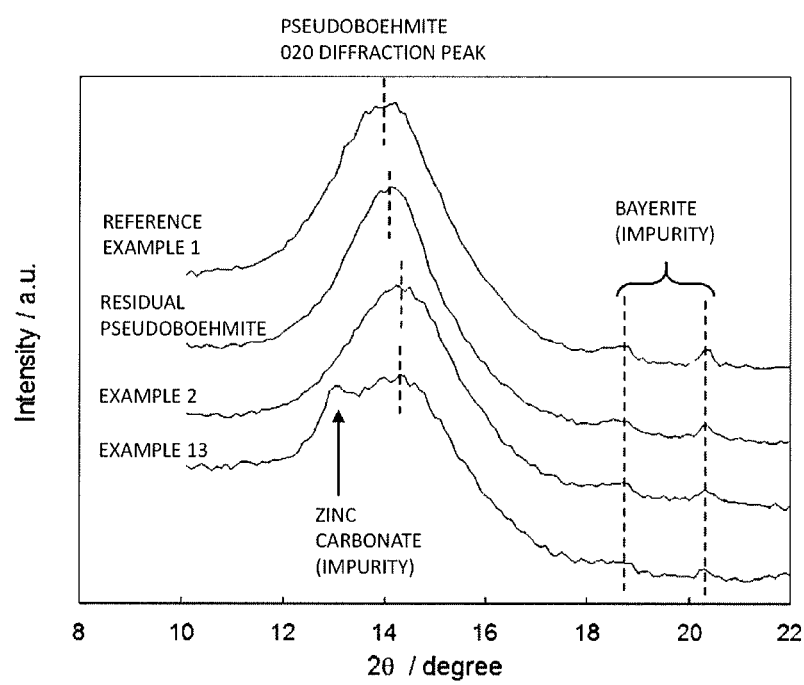
FIG. 3 XRD PATTERNS OF EXAMPLE 2, RESIDUAL PSEUDOBOEHMITE OBTAINED BY REMOVING SODIUM THIOSULFATE FROM EXAMPLE 2 BY HOT WATER-EXTRACTION THEREOF (RESIDUAL PSEUDOBOEHMITE), EXAMPLE 13 AND REFERENCE EXAMPLE 1

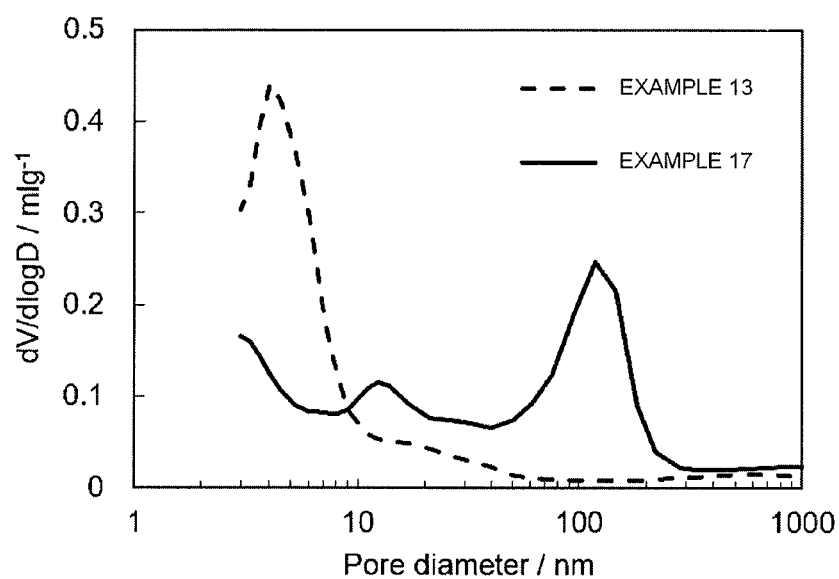
FIG.4 DIFFERENCE IN PORE VOLUME DISTRIBUTION BETWEEN SAMPLES OF EXAMPLE 13 AND EXAMPLE 17

AGENT FOR REMOVING HALOGEN GAS, METHOD FOR PRODUCING SAME, METHOD FOR REMOVING HALOGEN GAS WITH USE OF SAME, AND SYSTEM FOR REMOVING HALOGEN GAS

TECHNICAL FIELD

The present invention relates to a removing agent that allows a halogen-based gas, particularly a halogen-based waste gas arisen from halogen used in/as an etching gas or a cleaning agent in the production process for semiconductors, to efficiently react with a solid oxide to be fixed therein, and thereby prevents re-separation of the waste gas so as to not cause environmental pollution.

BACKGROUND ART

Examples of halogen-based gases include $F_2$, $Cl_2$, $Br_2$, $ClF_3$, $BrF_3$ and $BrF_5$, and in a broad sense, many kinds of halogenated non-metallic gases such as $SiF_4$ and $BCl_3$ are also included therein. As methods for removing halogen-based gases, a wet removing method in which a halogen-based gas is removed with a large amount of water in a scrubber, and a dry removing method in which a halogen-based gas is brought into contact with a solid to thereby decompose and fix it in said solid are conventionally known, and in recent years, a dry removing method has been widely used in view of e.g. ease of handling. In this case, there are risks of leakage and diffusion of a waste gas caused by e.g. lowering of removing ability of a removing agent column or replacement of columns accompanying said lowering, and therefore, a removing agent with a high removing ability capable of being minimized in frequency of replacement is required. As a method therefor, a method in which a waste gas is passed through a column packed with particulate activated carbon, activated alumina or soda lime to thereby remove the gas has been conventionally carried out. However, although these materials used in the column such as activated carbon can adsorb a halogen-based gas therein, they cannot decompose the gas, and thus there is a concern that a harmful gas is released from the materials after the disposal thereof and causes problems. Moreover, there is a risk that the activated carbon reacts with a halogen gas will cause a thermal runaway. On that account, a material that can decompose a halogen-based gas through oxidation-reduction or other chemical reactions and can fix the gas therein is desired as the removing agent.

If the harmful gas is an acidic gas such as hydrogen chloride, such a gas can be removed using a removing agent which comprises an alkaline material such as slaked lime to enable neutralization of the gas and salt formation (Patent Literature 1), but in the case of a covalently bonded gas such as chlorine gas, treatment by neutralization only exerts a small effect. Therefore, in order to accelerate the decomposition of halogen-based gases, mixed materials of iron oxide etc. and an alkali material have been proposed (for example, Patent Literature 2). Through this method, the removing performance can be enhanced to a certain extent, but these materials do not sufficiently meet the requirements for higher removing ability.

In connection with such requirements for further improvement in removing ability, a removing agent comprising a sulfur-containing reducing agent, zinc oxide and a molding aid such as bentonite has been proposed (Patent Literature 3). In this proposal, a removing agent comprising zinc oxide as well as a reducing agent such as a sulfite and a thiosulfate and a molding aid is used to reduce a halogen-based gas and fix the hydrogen halide produced in the zinc compound. Moreover, a proposal has been made in which removing performance is enhanced by selecting a thiosulfate pentahydrate as the sulfur-containing reducing agent in Patent Literature 3 and combining the reducing agent with an alkali metal salt such as sodium hydrogen carbonate (Patent Literature 4).

By the method shown in Patent Literature 4, the halogen gas removing ability has been improved to a certain extent, but in recent circumstances where the emission of halogen gases is rapidly increasing because of the rapid increase in scale of semiconductor factories and mass production therein, a removing agent having a much higher performance is desired.

As described above, though techniques for removing halogen-based gases have been developed, the market needs a removing agent of higher performance at a higher speed than said development speed, and those needs have not actually been satisfied.

CITATION LIST

Patent Literature

Patent Literature 1: JP2005177576A
Patent Literature 2: JP07275646A
Patent Literature 3: JP4913271B
Patent Literature 4: JP4952250B

SUMMARY OF INVENTION

Technical Problem

It is an object of the present invention to provide a halogen gas removing agent that efficiently decomposes a halogen-based gas, particularly a halogen-based waste gas arisen from halogen used in/as an etching gas or a cleaning agent in the production process for semiconductors, and is thereby improved in removing ability for the waste gas.

Other objects of the present invention will be apparent from the following description.

Solution to Problem

In light of the above, the present inventors have undertaken thorough research to overcome the disadvantages of the conventional techniques and to improve halogen gas removing agents in the removing ability. As a result, they have obtained knowledge and guidelines such as the below as ideas to achieve the objects of the present invention.

(1) In order to enhance the ability to decompose and remove a halogen gas, the present inventors have focused on thiosulfates that are regarded as effective for the removal of halogen in Patent Literatures 3 and 4, and examined halogen decomposition mechanism thereof. As shown in Comparative Example 1 described later, a sample comprising 100% of sodium thiosulfate pentahydrate was prepared, and as a result, in the case of the thiosulfate alone, the removing ability of the sample was either extremely low or not observed. From this, the present inventors found that the reducing agent does not play a leading role in the decomposition of halogen and acts as a guest that leads to the increase of activity only when it is combined with a reaction field (host) formed of another material.

(2) The present inventors then searched for various host materials from a wide variety of materials, and as a result, found that a combination of pseudoboehmite and a thiosulfate exerts a specifically high activity effect.

(3) Although the details of the host-guest interaction between pseudoboehmite and the thiosulfate have not yet been sufficiently clarified, but it has been hypothesised that pseudoboehmite and a thiosulfate supported thereon strongly interact with each other to cause a change in the XRD pattern of the pseudoboehmite and enhance the halogen reduction performance. It can also be thought that destabilized hydration water in the thiosulfate, in an amorphous state, formed as a result of such an interaction preferably enhances the halogen reduction performance.

(4) Moreover, the present inventors have found that the removing ability can be further improved by further adding, as a third component, an inorganic compound of an alkaline earth metal, a zinc group element or a transition metal, such as magnesium carbonate, zinc oxide or zinc carbonate.

(5) Furthermore, the present inventors have also found that a remarkable improvement in the removing performance can be attained by optimizing the structure of the removing agent, specifically by changing a method for shaping a removing agent to intentionally adjust the pore volume distribution therein. Thus, the present invention has been accomplished.

The present invention relates to the following:

1. A halogen gas removing agent comprising at least pseudoboehmite and a sulfur-containing reducing agent.
2. The removing agent according to item 1, comprising the pseudoboehmite in an amount of 40% by weight or more, based on the total weight of the removing agent.
3. The removing agent according to item 1 or 2, comprising the reducing agent in an amount of 1 to 8% by weight based on the content of the sulfur element, relative to the total weight of the pseudoboehmite and the reducing agent.
4. The removing agent according to any one of items 1 to 3, wherein the reducing agent is selected from the group consisting of thiosulfates, sulfites, dithionites and tetrathionates.
5. The removing agent according to item 4, wherein the reducing agent is a salt hydrate.
6. The removing agent according to any one of items 1 to 5, further comprising at least one inorganic compound selected from the group consisting of metal oxides, metal hydroxides, metal carbonates and metal hydrogen carbonates.
7. The removing agent according to item 6, wherein the metal is selected from the group consisting of an alkaline earth metal element, a transition metal element and a zinc group element.
8. The removing agent according to item 6 or 7, wherein the content of the inorganic compound is 1% by weight to 40% by weight, based on the total weight of the removing agent.
9. The removing agent according to any one of items 6 to 8, comprising, as the inorganic compound, at least one inorganic compound selected from the group consisting of magnesium hydroxide, magnesium carbonate, calcium carbonate, goethite, zinc carbonate and zinc oxide.
10. The removing agent according to any one of items 6 to 9, wherein the compositional ratio by weight among the pseudoboehmite, the sulfur-containing reducing agent and the inorganic compound is 40 to 98:1 to 25:1 to 40 when the total of these components is 100.
11. The removing agent according to any one of items 6 to 10, wherein the total weight of the pseudoboehmite, the sulfur-containing reducing agent and the inorganic compound is 90 to 100% by weight, based on the total weight of the removing agent.
12. The removing agent according to any one of items 1 to 11, wherein the 020 diffraction peak assigned to the pseudoboehmite, given by the XRD measurement of said removing agent using Cu Kα radiation, is shifted to the higher angle side as compared to the corresponding peak given by the measurement of pseudoboehmite alone.
13. The removing agent according to any one of items 1 to 12, wherein the total pore volume of pores having diameters of 3.0 nm to 500 nm, as measured by mercury porosimetry, is 0.05 ml/g to 1 ml/g.
14. The removing agent according to item 13, wherein the total pore volume of pores having diameters of 3.0 nm to 500 nm, as measured by mercury porosimetry, is 0.11 ml/g to 0.5 ml/g.
15. The removing agent according to item 13 or 14, wherein the total pore volume of pores having diameters of 10 nm to 500 nm, relative to the total pore volume of pores having diameters of 3.0 nm to 500 nm, as measured by mercury porosimetry, is 10% or more.
16. The removing agent according to item 15, wherein the total pore volume of pores having diameters of 10 nm to 500 nm, relative to the total pore volume of pores having diameters of 3.0 nm to 500 nm, as measured by mercury porosimetry, is 40% or more.
17. The removing agent according to any one of items 4 to 16, wherein the sulfur-containing reducing agent is a thiosulfate, and at least a part of the thiosulfate exists in an amorphous state.
18. The removing agent according to any one of items 1 to 17, wherein the sulfur-containing reducing agent is a thiosulfate pentahydrate.
19. The removing agent according to any one of items 1 to 18, wherein the halogen in the halogen gas is selected from the group consisting of fluorine, chlorine, bromine and iodine.
20. A method for producing the removing agent according to any one of items 1 to 19, comprising mixing and/or kneading pseudoboehmite, a sulfur-containing reducing agent and optionally a dispersion medium, then shaping the mixture, followed by drying.
21. The process according to item 20, wherein the drying is carried out at 30 to 90° C.
22. The process according to item 21, wherein the drying is carried out at 40 to 55° C.
23. The process according to any one of items 20 to 22, wherein the shaping is carried out using a plunger extruder.
24. Use of the removing agent according to any one of items 1 to 19, for removing a halogen gas from a halogen gas-containing gas under the following conditions:
   temperature: 200° C. or lower, and
   space velocity of the halogen gas-containing gas: 100 to 1000 $h^{-1}$.
25. A halogen gas removing system, comprising the removing agent according to any one of items 1 to 19 and a hydrogen halide adsorbent and/or $SO_2$ adsorbent, the adsorbent being placed downstream of the removing agent and connected to said removing agent.
26. The system according to item 25, wherein the adsorbent comprises at least one material selected from the group consisting of quick lime, slaked lime and zeolite.

27. A method for removing a halogen gas from a halogen-containing gas, comprising bringing the halogen-containing gas into contact with the removing agent according to any one of items 1 to 19.

Advantageous Effects of Invention

In the present invention, the following effects are mainly exerted:
(1) A halogen-based gas, particularly a halogen gas emitted from e.g. an etching gas or a cleaning apparatus in the production of semiconductors, can be efficiently removed, and an enhanced removing ability can be achieved.
(2) A risk that a halogen gas undergoes desorption/reseparation to cause environmental pollution can be reduced.
(3) A removing agent of high safety that prevents leakage accompanying deterioration of the removing agent, a process for producing the removing agent, and a system using the removing agent can be provided.
(4) A removing agent of more excellent environmental safety that realizes a high throughput so as to be able to cope with an increase in an emission rate of a halogen gas emitted from an emission source, a process for producing the removing agent, and a system using the removing agent can be provided.
(5) Owing to the improvement in removing ability of a removing agent, the cost for the removing agent can be reduced, and besides, the frequency of replacement of columns can be decreased, whereby the risk of serious accidents can be reduced.
(6) Totalized removing ability for harmful gases can be improved by placing a treating agent at a stage following a removing agent and connecting the former to the latter, said treating agent being capable of absorbing an acidic gas (such as hydrogen halide and sulfurous acid gas) that is liable to break through prior to deterioration of the removing agent.

BRIEF DESCRIPTION OF DRAWINGS

FIG. 1 shows an example of a halogen gas removing system according to the present invention (constitution of improved system for removing halogen gas).

FIG. 2 shows XRD patterns of a removing agent of the present invention, pseudoboehmite used in the removing agent and sodium thiosulfate pentahydrate used in the removing agent (XRD patterns of Example 2 (pseudoboehmite and sodium thiosulfate pentahydrate), Reference Example 1 (pseudoboehmite) and Comparative Example 1 (sodium thiosulfate pentahydrate)).

FIG. 3 shows XRD patterns of removing agents of the present invention (XRD patterns of Example 2, residual pseudoboehmite obtained after hot water extraction of sodium thiosulfate from the Example 2 sample (residual pseudoboehmite), Example 13 and Reference Example 1).

FIG. 4 shows pore volume distributions in removing agents of the present invention (difference in pore volume distribution between Example 13 sample and Example 17 sample).

DESCRIPTION OF EMBODIMENTS

The present invention relates to a halogen gas removing agent comprising at least pseudoboehmite as a host material and a sulfur-containing reducing agent as a guest material. As the sulfur-containing compounds, reducing agents containing a sulfur atom (e.g. sulfites, thiosulfates) can be used without any restriction, as described below, but for the sake of simplicity, detailed descriptions will be made with a focus on embodiments using a thiosulfate as the sulfur-containing reducing agent. The descriptions of those embodiments are also applicable to other embodiments using sulfur-containing reducing agents other than thiosulfates, and a person skilled in the art will also appropriately understand the other embodiments by referring to these descriptions.

Examples of the halogen gases in the present invention include fluorine ($F_2$), chlorine ($Cl_2$) and bromine ($Br_2$) that are formed by bonding of halogen elements, and gaseous non-metallic halogen compounds, such as chlorine trifluoride ($ClF_3$), bromine trifluoride ($BrF_3$), bromine pentafluoride ($BrF_5$), $SiF_4$ and $BCl_3$.

The pseudoboehmite in the present invention is an aluminum compound represented by a molecular formula of $Al_2O_3 \cdot NaH_2O$ (n=1 to 2), and has a structure of two stacked layers of edge-sharing $AlO_6$ octahedra (octahyrora sheet), said layers being held by hydrogen bonds between the surface aluminol groups. If the pseudoboehmite is heated, it is stable at a temperature up to about 300° C., but at 400° C. or higher, it is dehydrated and becomes γ-alumina.

For example, as the pseudoboehmite in the present invention, pseudoboehmite in the form of a powder or an aqueous dispersion (sol) is available (e.g. WISH 6006, Wish Chemicals Yueyang Co., Ltd.), and both can be used in the present invention. Since the removing agent of the present invention is typically produced by way of a paste as shown in the Examples described later, the pseudoboehmite raw material is preferably in the form of a powder because for ease of handling. The pseudoboehmite particles preferably have a specific surface area of 100 $m^2/g$ to 1000 $m^2/g$, and more preferably 150 to 450 $m^2/g$, in view of the adsorption percentage of a halogen gas and maintenance of physical strength of the particles. The specific surface area can be measured by the BET method.

In the present invention, the pseudoboehmite preferably has a total pore volume of pores having diameters of 3 to 500 nm, of 0.02 ml/g to 2.0 ml/g, more preferably 0.05 ml/g to 1 ml/g, and particularly preferably 0.11 ml/g to 0.7 ml/g, for example, 0.2 ml/g to 0.5 ml/g. The pseudoboehmite preferably has a total pore volume of pores having diameters of 10 to 500 nm, of 0.002 ml/g to 2.0 ml/g, more preferably 0.005 ml/g to 1 ml/g, and particularly preferably 0.01 ml/g to 0.7 ml/g, for example, 0.02 ml/g to 0.5 ml/g. The total pore volume of pores having diameters of 10 nm to 500 nm is preferably 10% or more, more preferably 25% or more, and still more preferably 40% or more, for example, 60% or more or 70% or more, relative to the total pore volume of pores having diameters of 3.0 nm to 500 nm. The upper limit is not particularly restricted, but it can be, for example, 90% or less, or 85% or less. Although the reason why such a range of pore volume is preferable is not clear, it is presumed as follows. In a range less than the aforementioned one, the thiosulfate for assisting the decomposition of halogen gas cannot be sufficiently supported on the pseudoboehmite, and/or a sufficient contact area of halogen gas with the pseudoboehmite cannot be ensured, so that the removing performance decreases. Moreover, when the total pore volume exceeds the above range, the removing agent is decreased in physical strength and thereby broken by, for example, the pressure inside the column during use, to hinder the introduction of the halogen gas; and therefore, the decomposition rate is liable to decrease.

The total pore volume can be measured by the mercury porosimetry, as described in Examples.

The content of the pseudoboehmite in the removing agent can be, for example, 30% by weight or more, and preferably 40% by weight or more, based on the total weight of the removing agent. In an embodiment of the present invention, the content of the pseudoboehmite is 30 to 99% by weight, preferably 45 to 95% by weight, and particularly preferably 50 to 93% by weight, based on the total weight of the removing agent. When the amount of the pseudoboehmite is in the above range, it is possible to achieve particularly good halogen decomposition activity.

The sulfur-containing reducing compound in the present invention is not particularly limited as long as it is a reducing agent having a sulfur atom. For example, thiosulfates, sulfites, dithionites or tetrathionates can be used. For example, when a thiosulfate is used as the sulfur-containing reducing agent, examples of the thiosulfates include sodium thiosulfate, potassium thiosulfate and ammonium thiosulfate. It is preferable to particularly use, as the sulfur-containing reducing agent, a reducing agent comprising hydration water, such as the aforesaid salts in the form of a hydrate (a salt hydrate). Among them, a pentahydrate of thiosulfate, for example, sodium thiosulfate pentahydrate, is particularly preferable.

The content of the reducing agent in the removing agent is, for example, 1% by weight to 70% by weight, preferably 5% by weight to 55% by weight, particularly preferably 7% by weight to 50% by weight, for example, 7% by weight to 30% by weight, based on the total weight of the pseudoboehmite and the reducing agent. When the amount of the sulfur-containing reducing agent is in the above range, it is possible to achieve particularly good halogen decomposition activity. When the reducing agent is a salt hydrate, the content and ratio of the reducing agent shown herein were calculated by including the hydration water, unless otherwise stated.

The removing agent of the present invention can comprise the reducing agent preferably in an amount of 0.5 to 10% by weight, and more preferably 1 to 8% by weight, for example, 3 to 7% by weight or 4 to 6% by weight, based on the content of the sulfur element, relative to the total weight of the pseudoboehmite and the reducing agent. This sulfur atom content can be measured by combustion in oxygen flow-infrared absorption method, as described in Examples.

A third component other than the pseudoboehmite and the reducing agent can, if necessary, be added to the removing agent as an additive. Such an additive is preferably at least one inorganic compound selected from metal oxides, metal hydroxides, metal carbonates and metal hydrogen carbonates. The above metal is preferably at least one element selected from alkaline earth metal elements, transition metal elements and zinc group elements. Preferred examples of the inorganic compounds include zinc oxide, magnesium hydroxide, magnesium carbonate, calcium carbonate, zinc carbonate and goethite. Of these, zinc oxide is particularly preferable. In this case, the content of the inorganic compound is preferably 1% by weight to 50% by weight, more preferably 2% by weight to 40% by weight, and particularly preferably 3% by weight to 35% by weight, based on the total weight of the removing agent. When the content of the inorganic compound is in the above range, particularly good halogen removing ability is achieved.

As described above, the halogen gas removing agent according to the present invention comprises the pseudoboehmite and the sulfur-containing reducing agent. The halogen gas removing agent according to the present invention can further comprise the inorganic compound. The removing agent may comprise other components such as a dispersion medium and a molding aid, within limits which are not detrimental to the effects of the present invention.

In an embodiment of the present invention, the removing agent substantially consists of only the pseudoboehmite, the sulfur-containing reducing agent and optionally a dispersion medium, or substantially consists of only the pseudoboehmite, the sulfur-containing reducing agent, the inorganic compound and optionally a dispersion medium.

In another embodiment of the present invention, the removing agent comprises no alkali metal salt (excluding the sulfur-containing reducing agent). In a further embodiment of the present invention, the removing agent comprises no bentonite.

In an embodiment of the present invention, the total weight of the pseudoboehmite and the sulfur-containing reducing agent (or the total weight of the pseudoboehmite, the sulfur-containing reducing agent and the inorganic compound when the removing agent comprises the inorganic compound) in the removing agent can be 70 to 100% by weight, preferably 80 to 100% by weight, and particularly preferably 90 to 100% by weight, for example, 95 to 100% by weight, based on the total weight of the removing agent.

The compositional ratio by weight among the pseudoboehmite, the reducing agent and the inorganic compound (optional) in the removing agent is preferably 40 to 99:1 to 25:0 to 40 by weight, for example, 40 to 98:1 to 25:1 to 40 by weight, when the total weight of these components is 100. For example, when a thiosulfate pentahydrate is used as the reducing agent, the compositional ratio by weight among the pseudoboehmite, the thiosulfate pentahydrate and the inorganic compound (optional) is preferably 40 to 99:1 to 25:0 to 40 by weight, for example, 40 to 98:1 to 25:1 to 40 by weight, when the total weight of these components is 100.

The removing agent according to the present invention can be produced by, for example, a method in which the pseudoboehmite, the sulfur-containing reducing agent and optionally the optional inorganic compound and, additionally if necessary, a dispersion medium are mixed/kneaded, shaped and then dried. The pseudoboehmite, the sulfur-containing reducing agent such as a thiosulfate, and the inorganic compound are each usually provided as a powder. In this case, those powders are weighed and mixed. For example, in order to prepare general extruded cylindric pellets, pseudoboehmite and the reducing agent powder (and optionally the inorganic compound) can be sufficiently dry-mixed in predetermined amounts in a mixing kneader, and then kneaded after water is added in an amount of 0.1 to 1 part by weight, preferably 0.3 to 0.5 part by weight, based on 1 part by weight of the mixed powder. In this case, the water is desirably divided and introduced so that the mixture should not become heterogeneous. For the kneading, a kneader for food production, such as a grinding machine, can be used. The dispersion medium can be used for the purpose of dispersing pseudoboehmite and the reducing agent (and optionally the inorganic compound) to homogeneously mix them and for the purpose of imparting a cohesive force for maintaining a fixed shape during the shaping and drying steps. As the dispersion medium, water is preferably used, but organic solvents such as alcohols or other additives can also be used, when needed.

The kneaded raw materials can then be shaped. If the materials in the form of powders are used as they are, the resulting removing agent becomes pasty because of water generated with the decomposition of a halogen gas, and it may become difficult to treat a halogen gas with such a removing agent. In order to prevent the removing agent from losing its shape due to water, etc. generated with the decomposition of a halogen gas, while keeping contact of a halogen gas with the removing agent constant, it is preferable to impart proper mechanical strength and shape to the removing agent.

The shape and size of the removing agent according to the present invention can be appropriately selected depending on the usage form, but in general, a cylindric pellet having a diameter of 1 to 6 mm and a length of about 3 to 20 mm is preferably used. However, as a matter of course, the shape and size are not limited thereto, and various irregular-shaped pellets, tablets, granulates, crushed granulates and fine particles obtainable by spray drying, etc. are employable.

In the present invention, the pore volume of the removing agent can also play an important role, and therefore, a shaping method capable of applying a proper mechanical pressure is preferably used. It is preferable to carry out shaping while applying a pressure of 30 to 200 kg/cm$^2$, and particularly preferably a pressure of 50 to 100 kg/cm$^2$. As machines for such shaping, general granulators, etc. can be used. Of these, a disc pelleter and a plunger extruder that are capable of adjusting to the above pressure and provide shaped bodies with excellent uniformity are preferably used, and of these, a plunger extruder is particularly preferable.

The shaped removing agent can be then dried. In the present invention, the reducing agent is preferably contained in the form of hydrate thereof in the removing agent, and therefore, the drying temperature is preferably lower than the elimination temperature of the hydration water. For example, when a thiosulfate is used as the reducing agent, the drying temperature is preferably room temperature to 95° C., preferably 30 to 90° C., more preferably 35 to 80° C., and particularly preferably 40 to 70° C., for example, 40 to 55° C. The drying time is preferably 10 minutes to one month, more preferably one hour to one week, and particularly preferably 3 hours to 2 days. If the time is too short, the physical strength and the gas removing performance of the removing agent are liable to decrease due to the residual moisture content, etc., and if the time is too long, the efficiency for manufacturing the removing agent is liable to decrease. The drying can be carried out by using, for example, an electric heater, and thereafter, the removing agent can be stored in a container containing a desiccant, when needed.

In an embodiment of the present invention, the present invention relates to a halogen gas removing agent produced by a process comprising mixing and/or kneading pseudo-boehmite, a sulfur-containing reducing compound and optionally a dispersion medium (and the inorganic compound when said inorganic compound is comprised in said agent), and then shaping the mixture, followed by drying. The drying can be carried out at a temperature of, for example, 30 to 90° C., preferably 40 to 55° C., for a period of, for example, 10 minutes to one month, preferably one hour to one week, more preferably 3 hours to 2 days. The shaping can be carried out using, for example, a disc pelleter or a plunger extruder, preferably a plunger extruder.

When a halogen gas is introduced into the removing agent obtained by using such raw materials, formulation and production process as the above, reduction/decomposition of the halogen gas occurs, and the passing of the halogen gas through the removing agent is inhibited. However, it may be observed that a hydrogen halide and/or sulfurous acid gas passes through the removing agent and flows outside, before the halogen gas passes (breaks) through the removing agent without being treated with said agent (that is, before the halogen gas breaks through), or in some cases, immediately after the halogen gas is injected into the removing agent. It can be understood that this is because, even if the ability of the removing agent to decompose and remove a halogen gas remains, the removing agent lacks ability to trap decomposition products such as hydrogen chloride, and therefore, the acidic gases flow out. It is presumed that such passing of a hydrogen halide and/or sulfurous acid gas occurs according to formulae (1) to (3) below particularly when the removing agent does not comprise the inorganic compound. On the other hand, when said removing agent comprises the inorganic compound, a hydrogen halide and sulfuric acid that are reduction/decomposition products of a halogen gas can be removed by neutralization according to formulae (4) to (6) below, and moreover, production of sulfurous acid gas brought about according to formulae (2) to (3) can also be suppressed. (Formulae (1) to (6) below indicate a case using sodium thiosulfate pentahydrate.)

(Case where the removing agent does not comprise the inorganic compound)

$$4Cl_2 + Na_2S_2O_3 \cdot 5H_2O \rightarrow 6HCl + 2H_2SO_4 + 2NaCl \quad \text{Formula (1)}$$

$$Na_2S_2O_3 \cdot 5H_2O + 2HCl \rightarrow SO_2 + S + 2NaCl + 6H_2O \quad \text{Formula (2)}$$

$$Na_2S_2O_3 \cdot 5H_2O + H_2SO_4 \rightarrow SO_2 + S + Na_2SO_4 + 6H_2O \quad \text{Formula (3)}$$

(Case where the removing agent comprises the inorganic compound: example using ZnO)

$$4Cl_2 + Na_2S_2O_3 \cdot 5H_2O \rightarrow 6HCl + 2H_2SO_4 + 2NaCl \quad \text{Formula (4)}$$

$$ZnO + 2HCl \rightarrow ZnCl_2 + H_2O \quad \text{Formula (5)}$$

$$ZnO + H_2SO_4 \rightarrow ZnSO_4 + H_2O \quad \text{Formula (6)}$$

The larger the amount of the harmful gas that a harmful removing agent as shown by the present invention can remove is, the more preferable it is. However, the removing agent needs to have high performance in its removing rate in addition to the amount of gas removed. If, for example, in a semiconductor factory, the amount of a halogen gas emitted per unit of time increases and the emission rate of the gas exceeds the throughput of the removing agent, a halogen gas which is a harmful gas will leak out and cause pollution. The removing agent according to the present invention can remove a halogen gas at a halogen-containing waste gas space velocity of 100/h or more, or 500/h or more, or 1000/h or more, and can be used for the treatment of large scale emission sources.

The reason why the removing agent of the present invention has high-speed performance of removing a halogen gas is thought to be as follows. Specifically, it is presumed that a halogen gas is reduced with a thiosulfate to generate hydrogen chloride and sulfuric acid, as represented by the formula (1); and when the removing agent does not comprise the inorganic compound, the hydrogen chloride reacts with the thiosulfate and changes into sulfurous acid gas (formula (2)), while the sulfuric acid changes into sulfurous acid gas and sulfur (formula (3)), and thus, the reduction products are removed from the reaction field; however, when the removing agent comprises the inorganic compound, the hydrogen chloride reacts with the inorganic compound and changes into a normal salt (chloride) (formula (5)), while the sulfuric acid also changes into a normal salt (sulfate) (formula (6)), and thus, the reduction products are removed from the reaction field. It is thought that, since the hydrogen chloride and the sulfuric acid generated from chlorine gas are removed from the field, the equilibrium is shifted to the product side, and that therefore, the removing agent of the present invention has high-speed removing performance. The pseudoboehmite used in the present invention has a function to fix an acidic gas therein, and these effects are understood to contribute to the high removing performance of the removing agent.

Methods of using the removing agent of the present invention are not particularly limited, and for example, the removing agent can also be used in a moving bed or a fluidized bed, but it is usually used in a fixed bed. For example, a cylinder (e.g. column) is packed with the removing agent, and an exhaust gas which contains a halogen gas is introduced into the column, whereby the halogen gas can be removed from the exhaust gas safely and efficiently. Such removal of halogen gas can be carried out for exhaust gas containing halogen gas of, for example, 0.01 ppmv to 100% by volume, preferably 0.1 ppmv to 10% by volume, more preferably 1 ppmv to 5% by volume; and/or can be carried out at a temperature of 200° C. or lower, preferably 10 to 100° C., more preferably 20 to 90° C., for example, room temperature; and/or can be carried out with a removing agent bed thickness of 1 to 1000 cm, for example, 10 cm to 200 cm; and/or can be carried out at a halogen-containing gas space velocity of 1 to 2000 $h^{-1}$, for example, 100 to 1000 $h^{-1}$.

As previously described, when a halogen gas is decomposed by the removing agent according to the present invention, a hydrogen halide such as hydrogen chloride, sulfuric acid, etc. are formed as products. When the removing agent does not comprise the inorganic compound, the hydrogen halide is further decomposed by the thiosulfate into sulfurous acid gas. The sulfurous acid gas is fixed in the pseudoboehmite that is a host material of the removing agent, but if the amount of the sulfurous acid gas formed exceeds the fixing ability of the pseudoboehmite, the sulfurous acid gas passes (breaks) through the removing agent. Moreover, if the acid gas fixing ability of the removing agent according to the present invention decreases, the hydrogen halide gas passes through the removing agent, regardless of whether or not the removing agent comprises the inorganic compound. If the treatment proceeds further and the halogen gas decomposition ability of the removing agent (Formula (1) and Formula (4)) decreases, the halogen gas breaks through, and the removing agent reaches the end of its life. In order to prevent negative influence on the environment, the acidic gases (hydrogen halide and sulfurous acid gas) that result from the decomposition of the halogen gas also need to be removed, as well as the halogen gas itself. It is said that pseudoboehmite having a high specific surface area and aluminol groups has a certain degree of ability to adsorb and fix these decomposition products thereon/therein. However, if the amount of the halogen gas to be treated increases beyond the fixing ability of the pseudoboehmite, the hydrogen halide and sulfurous acid gas may pass through the removing agent and be discharged. In such cases, an adsorbent for acidic gases, which is capable of fixing hydrogen halides and/or sulfurous acid gas that break through prior to the breakthrough of the halogen gas, may be placed downstream of the halogen gas removing agent of the present invention and connected thereto, to reduce the frequency of replacement of the removing agent according to the present invention (e.g. in the form of a removing agent column). Since the adsorbent for acidic gases such as a hydrogen halide is generally inexpensive compared to the removing agent of the present invention, a system that is safer and is lower in total running cost becomes possible. An example of such a system is shown in FIG. 1.

As the acidic gas adsorbent used in an apparatus for absorbing acidic gases in the removing system of FIG. 1, any material which is capable of neutralizing and fixing hydrogen halides and/or sulfurous acid gas thereon/therein can be used. For example, basic materials, such as sodium hydroxide, sodium carbonate, slaked lime ($Ca(OH)_2$) and quick lime (CaO), can be used. Quick lime exhibits high removing performance for both the hydrogen halide and the sulfurous acid gas, and is particularly preferable. For treating these acidic gases, a known method using materials other than basic materials, for example, adsorbing materials such as activated carbon and zeolite, and other materials, can also be used.

Thus, it has been also found that, by placing a treating agent capable of trapping a halogen gas decomposition product downstream of the removing agent of the present invention and connecting the former to the latter, an acidic gas such as hydrogen chloride, which may break through prior to the breakthrough of a halogen gas, can be treated, thereby enhancing the total safety.

Accordingly, in an embodiment of the present invention, the present invention relates to a halogen gas removing system (or a halogen gas removing apparatus), comprising the removing agent and a hydrogen halide adsorbent and/or $SO_2$ adsorbent, the adsorbent being downstream of the removing agent and connected thereto. The adsorbent is preferably at least one material selected from the group consisting of quick lime, slaked lime and/or zeolite.

In an embodiment of the present invention, the present invention relates to a method for removing a halogen gas from a halogen-containing gas, comprising bringing the halogen-containing gas into contact with the removing agent. For example, the above contact can be carried out for an exhaust gas containing a halogen gas of 0.01 ppmv to 100% by volume, preferably 0.1 ppmv to 10% by volume, more preferably 1 ppmv to 5% by volume; and/or can be carried out at a temperature of 200° C. or lower, preferably 10 to 100° C., more preferably 20 to 90° C., for example, room temperature; and/or can be carried out with a removing agent bed thickness of 1 to 1000 cm, for example, 10 cm to 200 cm; and/or can be carried out at a halogen-containing gas space velocity of 1 to 2000 $h^{-1}$, for example, 100 to 1000 $h^{-1}$.

The present invention is described below in more detail with reference to the following examples, but the present invention is in no way limited to those examples.

EXAMPLES

Evaluation of physical properties, compositional analysis and evaluation of performance of removing agents used in the following examples and comparative examples were carried out by the methods described below.

(1) Tap density measurement of removing agent: 70 g of a removing agent was placed in a 100 ml graduated cylinder, and after tapping was carried out 100 times, the volume of the removing agent packed was read out, whereby the tap density (g/ml) was examined. Autotap from Quantachrome Instruments Japan was used as the measurement apparatus.
(2) Measurement of sulfur atom content: Model SC632 manufactured by LECO Japan Corporation was used. As a combustion catalyst, Com-Cat Accelerator was used. Sulfur atom contents of the treating agents are described in Tables 1 to 3.
(3) X-ray diffraction measurement: Using Model X'Pert PRO MPD manufactured by Spectris Co., Ltd., measurement was carried out by the powder X-ray diffractometry using Cu Kα radiation.

(4) Pore distribution measurement by mercury porosimetry: Model AutoPore III9420 manufactured by Micromeritics Instrument Corporation was used. A sample having been dried overnight in an electric dryer kept at 110° C. was placed in a desiccator containing silica gel and held for one hour or more to decrease the temperature to room temperature, and the resulting sample was used for the analysis. In the analysis, a large cell (5 ml×0.4 ml) was used.

(5) Evaluation of chlorine removing ability: a jacketed tubular reactor having an inner diameter of 2.23 cm was packed with 20 ml of a treating agent that was a test object, then dry nitrogen containing 1.0% by volume of chlorine ($Cl_2$) gas was introduced into the reactor at a space velocity (GHSV) of 500 $h^{-1}$ using a mass flow controller, and the amount of the gas introduced until detection of 1 ppmv of chlorine gas or hydrogen chloride (HCl) gas in the gas to be treated was examined. When the test was actually carried out, hydrogen chloride gas was detected simultaneously with chlorine gas, or earlier than chlorine gas, and a phenomenon where hydrogen chloride gas was detected later than chlorine gas was not observed. Temperature control of the reactor was carried out by circulating constant-temperature water into the jacket, and the temperature was set at 25° C. or 80° C. For the detection of chlorine gas, a detector tube (No 8La) from Gastec Corporation was used, for the detection of hydrogen chloride gas, a detector tube (No 14L) from Gastec Corporation was used, and for the detection of sulfurous acid gas ($SO_2$), a detector tube (No 5La) from Gastec Corporation was used, and analysis was carried out every 10 min to 15 min. The chlorine removing ability (L/kg) of the treating agent was calculated using the following formula (7).

Chlorine removing ability (L/kg)=space velocity (500 $h^{-1}$)×chlorine concentration (1.0% by volume)×time during which chlorine gas is treated (h)/tap density (kg/L)     Formula (7)

(6) Evaluation of bromine removing ability: a jacketed tubular reactor having an inner diameter of 2.23 cm was packed with 20 ml of a treating agent that was a test object, then dry nitrogen containing 1.0% by volume of bromine ($Br_2$) gas was introduced into the reactor at a space velocity (GHSV) of 500 $h^{-1}$ using a mass flow controller, and the amount of the gas introduced until detection of 1 ppmv of bromine gas or hydrogen bromide (HBr) gas in the gas to be treated was examined. When the test was actually carried out, hydrogen bromide gas was detected simultaneously with bromine gas, or earlier than bromine gas, and a phenomenon where hydrogen bromide gas was detected later than bromine gas was not observed. Temperature control of the reactor was carried out by circulating constant-temperature water into the jacket, and the temperature was set at 25° C. For the detection of bromine gas, a detector tube (No 8La) from Gastec Corporation was used, for the detection of hydrogen bromide gas, a detector tube (No 15L) from Gastec Corporation was used, and for the detection of sulfurous acid gas ($SO_2$), a detector tube (No 5La) from Gastec Corporation was used, and analysis was carried out every 10 min to 15 min. The bromine removing ability (L/kg) of the treating agent was calculated using the following formula (8).

Bromine removing ability (L/kg)=space velocity (500 $h^{-1}$)×bromine concentration (1.0% by volume)×time during which bromine gas is treated (h)/tap density (kg/L)     Formula (8)

Example 1

The process for preparing a removing agent sample was as follows. A pseudoboehmite powder and a sodium thiosulfate pentahydrate powder were weighed in such a manner that the amounts of pseudoboehmite and sodium thiosulfate pentahydrate were 90% by weight and 10% by weight, respectively, and they were mixed using a grinding machine (manufactured by Ishikawa Kojo Co. Ltd., Model 18) while water was added thereto, whereby a kneaded cake was obtained. Using a disc pelleter (Fuji Paudal Co., Ltd., Model F-5), the kneaded cake was shaped into a particulate shaped body having a diameter of about 2 mm and a length of about 6 mm. The resulting shaped body was dried overnight in an electric dryer kept at 50° C., thereafter placed in a desiccator and held for one hour or more to decrease the temperature to room temperature, whereby a removing agent sample of Example 1 was obtained. Sulfur atom content, tap density and chlorine removing ability of the resulting sample are set forth in Table 1.

Example 2

A removing agent sample of Example 2 comprising 82% by weight of pseudoboehmite and 18% by weight of sodium thiosulfate pentahydrate was prepared in an analogous manner under the same conditions as in Example 1. Sulfur atom content, tap density and chlorine removing ability of the resulting sample are set forth in Table 1.

Example 3

A removing agent sample of Example 3 comprising 75% by weight of pseudoboehmite and 25% by weight of sodium thiosulfate pentahydrate was prepared in an analogous manner under the same conditions as in Example 1. Sulfur atom content, tap density and chlorine removing ability of the resulting sample are set forth in Table 1.

Example 4

The same sample as in Example 2 was prepared, and the resulting sample was subjected to the evaluation of chlorine removing ability by the same method under the same conditions as in Example 2, except that the test temperature was changed to 80° C. The results are set forth in Table 1.

Reference Example 1

The process for preparing a sample of Reference Example 1 was undertaken as follows. A shaped body was prepared in the same manner under the same conditions as in Example 1, except that a kneaded cake was obtained by mixing only the pseudoboehmite powder in the grinding machine while water was added thereto. The resulting sample was subjected to the measurement of sulfur atom content, the measurement of tap density and the evaluation of chlorine removing ability at 25° C. by the same methods as in Example 1, and the results are set forth in Table 1.

Comparative Example 1

The process for preparing a sample of Comparative Example 1 was undertaken as follows. Crystals of sodium thiosulfate pentahydrate were crushed, and subjected to a sieve to give granules of 1.5 mm to 3.0 mm. The resulting sample of Comparative Example 1 was subjected to the measurement of sulfur atom content, the measurement of tap density and the evaluation of chlorine removing ability at 25° C., and the results are set forth in Table 1.

Comparative Example 2

The process for preparing a sample of Comparative Example 2 was undertaken as follows. A bentonite powder and a sodium thiosulfate pentahydrate powder were weighed in such a manner that the amounts of the bentonite powder and the sodium thiosulfate pentahydrate powder were 78% by weight and 22% by weight, respectively, and they were mixed using a grinding machine while water was added thereto, whereby a kneaded cake was obtained. Using a disc pelleter, the kneaded cake was shaped into a particulate shaped body having a diameter of about 2 mm and a length of about 6 mm. The resulting shaped body was dried overnight in an electric dryer kept at 50° C., thereafter placed in a desiccator and held for one hour or more to decrease the temperature to room temperature, whereby a sample of Comparative Example 2 was obtained. The resulting sample was subjected to the measurement of sulfur atom content, the measurement of tap density and the evaluation of chlorine removing ability at 25° C., and the results are set forth in Table 1.

Example 5

The process for preparing a sample of Example 5 was undertaken as follows. The same shaped body as in Example 2 was prepared in the manner as in Example 2, and then the resulting shaped body was dried overnight in an electric dryer kept at 150° C. The resulting sample was subjected to the measurement of sulfur atom content, the measurement of tap density and the evaluation of chlorine removing ability at 25° C., and the results are set forth in Table 1.

TABLE 1

Examples of halogen removing agent comprising pseudoboehmite-thiosulfate, and Reference Example and Comparative Examples

|  | Mixing ratio among raw materials | Temperature for drying catalyst | Sulfur atom content in catalyst | Temperature for chlorine removing test | Detection of sulfurous acid gas before detection of hydrogen chloride | Tap density | Chlorine removing ability |
|---|---|---|---|---|---|---|---|
| Ex. 1 | 90 wt % pseudoboehmite 10 wt % sodium thiosulfate pentahydrate | 50° C. | 2.6 wt % | 25° C. | yes | 0.86 g/ml | 16 L/kg |
| Ex. 2 | 82 wt % pseudoboehmite 18 wt % sodium thiosulfate pentahydrate | 50° C. | 4.8 wt % | 25° C. | yes | 0.89 g/ml | 20 L/kg |
| Ex. 3 | 75 wt % pseudoboehmite 25 wt % sodium thiosulfate pentahydrate | 50° C. | 6.6 wt % | 25° C. | yes | 0.93 g/ml | 10 L/kg |
| Ex. 4 | 82 wt % pseudoboehmite 18 wt % sodium thiosulfate pentahydrate | 50° C. | 4.8 wt % | 80° C. | yes | 0.89 g/ml | 31 L/kg |
| Ref. Ex. 1 | 100 wt % pseudoboehmite | 50° C. | 0 wt % | 25° C. | no | 0.80 g/ml | 6 L/kg |
| Comp. Ex. 1 | 100 wt % sodium thiosulfate pentahydrate | no drying step | 25.8 wt % | 25° C. | (immediate breakthrough) | 1.00 g/ml | 0 L/kg |
| Comp. Ex. 2 | 78 wt % bentonite 22 wt % sodium thiosulfate pentahydrate | 50° C. | 5.6 wt % | 25° C. | yes | 1.01 g/ml | 2 L/kg |
| Ex. 5 | 82 wt % pseudoboehmite 18 wt % sodium thiosulfate pentahydrate | 150° C. | 5.0 wt % | 25° C. | yes | 0.88 g/ml | 4 L/kg |

Example 6

The process for preparing a sample of Example 6 was undertaken as follows. A pseudoboehmite powder, a sodium thiosulfate pentahydrate powder and a magnesium hydroxide powder were weighed in such a manner that the percentage composition by weight of the pseudoboehmite powder, the sodium thiosulfate pentahydrate powder and the magnesium hydroxide powder was 58%, 19% and 23%, respectively, and they were mixed using a grinding machine while water was added thereto, whereby a kneaded cake was obtained. Using a disc pelleter, the kneaded cake was shaped into a particulate shaped body having a diameter of about 2 mm and a length of about 6 mm. The resulting shaped body was dried overnight in an electric dryer kept at 50° C., thereafter placed in a desiccator and held for one hour or more to decrease the temperature to room temperature, whereby a removing agent sample of Example 6 was obtained. The resulting sample was subjected to the measurement of sulfur atom content, the measurement of tap density and the evaluation of chlorine removing ability at 25° C., and the results are set forth in Table 2. In Table 2, D in the shaping method indicates a shaping with a disc pelleter, and P indicates a shaping with a plunger extruder.

Example 7

A sample of Example 7 was prepared in the same manner under the same conditions as in Example 6, except that pseudoboehmite, sodium thiosulfate pentahydrate and magnesium carbonate were weighed in such a manner that the percentage composition by weight of the pseudoboehmite, the sodium thiosulfate pentahydrate and the magnesium carbonate was 58%, 20% and 22%, respectively, then the sample was subjected to the same evaluations as in Example 6, and the results are set forth in Table 2.

Example 8

A sample of Example 8 was prepared in the same manner under the same conditions as in Example 6, except that pseudoboehmite, sodium thiosulfate pentahydrate and calcium carbonate were weighed in such a manner that the percentage composition by weight of the pseudoboehmite, the sodium thiosulfate pentahydrate and the calcium carbonate was 53%, 18% and 29%, respectively, then the sample was subjected to the same evaluations as in Example 6, and the results are set forth in Table 2.

Example 9

A sample of Example 9 was prepared in the same manner under the same conditions as in Example 6, except that pseudoboehmite, sodium thiosulfate pentahydrate and goethite were weighed in such a manner that the percentage composition by weight of the pseudoboehmite, the sodium thiosulfate pentahydrate and the goethite was 62%, 18% and 20%, respectively, then the sample was subjected to the same evaluations as in Example 6, and the results are set forth in Table 2.

Example 10

A sample of Example 10 was prepared in the same manner under the same conditions as in Example 6, except that pseudoboehmite, sodium thiosulfate pentahydrate and zinc carbonate were weighed in such a manner that the percentage composition by weight of the pseudoboehmite, the sodium thiosulfate pentahydrate and the zinc carbonate was 57%, 19% and 24%, respectively, then the sample was subjected to the same evaluations as in Example 6, and the results are set forth in Table 2.

Example 11

A sample of Example 11 was prepared in the same manner under the same conditions as in Example 6, except that pseudoboehmite, sodium thiosulfate pentahydrate and zinc oxide were weighed in such a manner that the percentage composition by weight of the pseudoboehmite, the sodium thiosulfate pentahydrate and the zinc oxide was 78%, 19% and 3%, respectively, then the sample was subjected to the same evaluations as in Example 6, and the results are set forth in Table 2.

Example 12

A sample of Example 12 was prepared in the same manner under the same conditions as in Example 6, except that pseudoboehmite, sodium thiosulfate pentahydrate and zinc oxide were weighed in such a manner that the percentage composition by weight of the pseudoboehmite, the sodium thiosulfate pentahydrate and the zinc oxide was 71%, 19% and 10%, respectively, then the sample was subjected to the same evaluations as in Example 6, and the results are set forth in Table 2.

Example 13

A sample of Example 13 was prepared in the same manner under the same conditions as in Example 6, except that pseudoboehmite, sodium thiosulfate pentahydrate and zinc oxide were weighed in such a manner that the percentage composition by weight of the pseudoboehmite, the sodium thiosulfate pentahydrate and the zinc oxide was 60%, 20% and 20%, respectively, then the sample was subjected to the same evaluations as in Example 6, and the results are set forth in Table 2.

Example 14

A sample of Example 14 was prepared in the same manner under the same conditions as in Example 6, except that pseudoboehmite, sodium thiosulfate pentahydrate and zinc oxide were weighed in such a manner that the percentage composition by weight of the pseudoboehmite, the sodium thiosulfate pentahydrate and the zinc oxide was 43%, 22% and 35%, respectively, then the sample was subjected to the same evaluations as in Example 6, and the results are set forth in Table 2.

Example 15

A sample prepared in exactly the same manner under the same conditions as in Example 13 was subjected to the evaluation of chlorine removing ability by exactly the same method under the same conditions, except for the test temperature (80° C.), and the results are set forth in Table 3.

Example 16

A shaped body was prepared in exactly the same manner under exactly the same conditions as in Example 13, and subsequently, the shaped body was dried overnight in an electric dryer kept at 150° C. to obtain a sample of Example 16. The resulting sample was subjected to the same evaluations as in Example 6, and the results are set forth in Table 3.

Comparative Example 3

A sample of Comparative Example 3 was prepared in the same manner under the same conditions as in Example 6, except that zinc oxide, bentonite and sodium thiosulfate pentahydrate were weighed in such a manner that the percentage composition by weight of the zinc oxide, the bentonite and the sodium thiosulfate pentahydrate was 39%, 39% and 22%, respectively, then the sample was subjected to the same evaluations as in Example 6, and the results are set forth in Table 3.

Comparative Example 4

A sample of Comparative Example 4 was prepared in the same manner under the same conditions as in Example 6, except that zinc oxide, hydrotalcite, sodium thiosulfate pentahydrate and bentonite were weighed in such a manner that the percentage composition by weight of the zinc oxide, the hydrotalcite, the sodium thiosulfate pentahydrate and the bentonite was 32%, 41%, 22% and 5%, respectively, then the sample was subjected to the same evaluations as in Example 6, and the results are set forth in Table 3.

Comparative Example 5

A sample of Comparative Example 5 was prepared in the same manner under the same conditions as in Example 6, except that zinc oxide, X-type zeolite, sodium thiosulfate pentahydrate and bentonite were weighed in such a manner that the percentage composition by weight of the zinc oxide, the X-type zeolite, the sodium thiosulfate pentahydrate and the bentonite was 40%, 35%, 20% and 5%, respectively, then the sample was subjected to the same evaluations as in Example 6, and the results are set forth in Table 3.

Comparative Example 6

A sample of Comparative Example 6 was prepared in the same manner under the same conditions as in Example 6, except that pseudoboehmite, sodium oxalate and zinc oxide were weighed in such a manner that the percentage composition by weight of the pseudoboehmite, the sodium oxalate and the zinc oxide was 64%, 9% and 27%, respectively, then the sample was subjected to the same evaluations as in Example 6, and the results are set forth in Table 3.

Example 17

The process for preparing a sample of Example 17 was as follows. A kneaded cake obtained in the same formulation as in Example 13 was used, and using a plunger extruder, the kneaded cake was shaped into a particulate shaped body having a diameter of about 2 mm and a length of about 6 mm. The resulting shaped body was dried overnight in an electric dryer kept at 50° C., thereafter placed in a desiccator and held for one hour or more to decrease the temperature to room temperature, whereby a removing agent sample of Example 17 was obtained. The resulting sample was subjected to the same evaluations as in Example 6, and the results are set forth in Table 3.

TABLE 2

| | Mixing ratio among raw materials | Temperature for drying catalyst | Sulfur atom content in catalyst | Shaping method | Temperature for chlorine removing test | Detection of sulfurous acid gas before detection of hydrogen chloride | Tap density | Chlorine removing ability |
|---|---|---|---|---|---|---|---|---|
| Ex. 6 | 58 wt % pseudoboehmite<br>19 wt % sodium thiosulfate pentahydrate<br>23 wt % magnesium hydroxide | 50° C. | 4.8 wt % | D | 25° C. | yes | 0.75 g/ml | 22 L/kg |
| Ex. 7 | 58 wt % pseudoboehmite<br>20 wt % sodium thiosulfate pentahydrate<br>22 wt % magnesium carbonate | 50° C. | 5.1 wt % | D | 25° C. | yes | 0.70 g/ml | 26 L/kg |
| Ex. 8 | 53 wt % pseudoboehmite<br>18 wt % sodium thiosulfate pentahydrate<br>29 wt % calcium carbonate | 50° C. | 4.5 wt % | D | 25° C. | yes | 1.01 g/ml | 22 L/kg |
| Ex. 9 | 62 wt % pseudoboehmite<br>18 wt % sodium thiosulfate pentahydrate<br>20 wt % goethite | 50° C. | 4.6 wt % | D | 25° C. | yes | 1.05 g/ml | 22 L/kg |
| Ex. 10 | 57 wt % pseudoboehmite<br>19 wt % sodium thiosulfate pentahydrate<br>24 wt % zinc carbonate | 50° C. | 4.8 wt % | D | 25° C. | no | 0.96 g/ml | 29 L/kg |
| Ex. 11 | 78 wt % pseudoboehmite<br>19 wt % sodium thiosulfate pentahydrate<br>3 wt % zinc oxide | 50° C. | 4.8 wt % | D | 25° C. | yes | 0.90 g/ml | 23 L/kg |
| Ex. 12 | 71 wt % pseudoboehmite<br>19 wt % sodium thiosulfate pentahydrate<br>10 wt % zinc oxide | 50° C. | 4.9 wt % | D | 25° C. | no | 0.94 g/ml | 31 L/kg |

TABLE 2-continued

| | Mixing ratio among raw materials | Temperature for drying catalyst | Sulfur atom content in catalyst | Shaping method | Temperature for chlorine removing test | Detection of sulfurous acid gas before detection of hydrogen chloride | Tap density | Chlorine removing ability |
|---|---|---|---|---|---|---|---|---|
| Ex. 13 | 60 wt % pseudoboehmite 20 wt % sodium thiosulfate pentahydrate 20 wt % zinc oxide | 50° C. | 5.1 wt % | D | 25° C. | no | 0.98 g/ml | 31 L/kg |
| Ex. 14 | 43 wt % pseudoboehmite 22 wt % sodium thiosulfate pentahydrate 35 wt % zinc oxide | 50° C. | 5.7 wt % | D | 25° C. | no | 1.15 g/ml | 24 L/kg |

*Shaping method D: disc pelleter
**Shaping method P: plunger extruder

TABLE 3

Examples of removing agent comprising inorganic compound and Comparative Examples

| | Mixing ratio | Temp. drying | Sulfur content | Shaping | Temp. test | SO2 detection | Tap density | Cl removing |
|---|---|---|---|---|---|---|---|---|
| Ex. 15 | 60 wt % pseudoboehmite 20 wt % sodium thiosulfate pentahydrate 20 wt % zinc oxide | 50° C. | 5.1 wt % | D | 80° C. | no | 0.98 g/ml | 33 L/kg |
| Ex. 17 | 60 wt % pseudoboehmite 20 wt % sodium thiosulfate pentahydrate 20 wt % zinc oxide | 50° C. | 5.1 wt % | P | 25° C. | no | 0.96 g/ml | 39 L/kg |
| Ex. 16 | 60 wt % pseudoboehmite 20 wt % sodium thiosulfate pentahydrate 20 wt % zinc oxide | 150° C. | 5.4 wt % | D | 25° C. | yes | 0.95 g/ml | 9 L/kg |
| Comp. Ex. 3 | 39 wt % zinc oxide 39 wt % bentonite 22 wt % sodium thiosulfate pentahydrate | 50° C. | 5.7 wt % | D | 25° C. | yes | 1.23 g/ml | 2 L/kg |
| Comp. Ex. 4 | 32 wt % zinc oxide 41 wt % hydrotalcite 22 wt % sodium thiosulfate pentahydrate, 5 wt % bentonite | 50° C. | 6.1 wt % | D | 25° C. | yes | 0.85 g/ml | 15 L/kg |
| Comp. Ex. 5 | 40 wt % zinc oxide 35 wt % X-type zeolite 20 wt % sodium thiosulfate pentahydrate 5 wt % bentonite | 50° C. | 5.3 wt % | D | 25° C. | yes | 0.89 g/ml | 13 L/kg |
| Comp. Ex. 6 | 64 wt % pseudoboehmite 9 wt % sodium oxalate 27 wt % zinc oxide | 50° C. | 0 wt % | D | 25° C. | yes | 0.91 g/ml | 3 L/kg |

The measurement results of Examples 6 to 17 and Comparative Examples 3 to 6 are set forth in Table 2 and Table 3.

Example 18

The same sample as in Example 10 was subjected to the evaluation of bromine removing ability at 25° C. The result is set forth in Table 4.

Example 19

The same sample as in Example 13 was subjected to the evaluation of bromine removing ability at 25° C. The result is set forth in Table 4.

Comparative Example 7

A sample prepared in the same manner under the same conditions as in Comparative Example 6 was subjected to the evaluation of bromine removing ability at 25° C. The result is set forth in Table 4.

From the results of Examples 18 and 19 and Comparative Example 7, it is considered that even if the removing agents are used for removing different halogen gases (fluorine, chlorine, bromine or iodine), the respective removing agents achieve equal or nearly equal of removing performance for every halogen gas.

TABLE 4

Evaluation results of bromine gas removing performance

| | Mixing ratio among raw materials | Temperature for drying catalyst | Sulfur atom content in catalyst | Temperature for chlorine removing test | Detection of sulfurous acid gas before detection of hydrogen bromide | Bromine removing ability |
|---|---|---|---|---|---|---|
| Ex. 18 | 57 wt % pseudoboehmite<br>19 wt % sodium thiosulfate pentahydrate<br>24 wt % zinc carbonate | 50° C. | 4.8 wt % | 25° C. | no | 31 L/kg |
| Ex. 19 | 60 wt % pseudoboehmite<br>20 wt % sodium thiosulfate pentahydrate<br>20 wt % zinc oxide | 50° C. | 5.1 wt % | 25° C. | no | 32 L/kg |
| Comp. Ex. 7 | 64 wt % pseudoboehmite<br>9 wt % sodium oxalate<br>27 wt % zinc oxide | 50° C. | 0 wt % | 25° C. | yes | 2 L/kg |

Analysis Example 1

The sample of Reference Example 1 (pseudoboehmite), the sample of Comparative Example 1 (sodium thiosulfate pentahydrate) and the sample of Example 2 (pseudoboehmite-sodium thiosulfate pentahydrate) were each subjected to the X-ray diffraction measurement, and the results thereof are shown in FIG. 2.

It can be seen that the pseudoboehmite itself and the sodium thiosulfate pentahydrate each exhibit a characteristic XRD pattern. However, in the XRD pattern of the sample of Example 2, which is a mixture of said two substances, only a diffraction peak attributable to the pseudoboehmite is observed, and not only is a peak indicating sodium thiosulfate pentahydrate not observed, but no newly added peaks are observed either. From this, the sodium thiosulfate in the sample of Example 2 is understood to be amorphous.

Analysis Example 2

As a sample for analysis, the sample of Example 2 was subjected to the XRD measurement. As comparative samples, a sample of pseudoboehmite (residual pseudoboehmite) obtained by dispersing the sample of Example 2 in hot water to dissolve sodium thiosulfate therein and removing and separating the sodium thiosulfate from pseudoboehmite, and pseudoboehmite (sample of Reference Example 1) were also likewise subjected to the X-ray diffraction measurement. The results are shown in FIG. 3.

In FIG. 3, a large 020 diffraction peak assigned to pseudoboehmite at a 2θ angle of around 14 degrees (within a range of 14±0.5 degrees) and small peaks attributable to bayerite that is an impurity at 2θ angles of around 18.7 degrees and around 20.3 degrees can be observed in common. No change in the position of the small peaks of bayerite, depending on the type of a sample, was observed. However, the peak assigned to the pseudoboehmite is shifted, in the case of the sample of Example 2 (pseudoboehmite-sodium thiosulfate pentahydrate) containing pseudoboehmite and sodium thiosulfate pentahydrate, to the higher angle side on the basis of that of the Reference Example 1 sample, and also the peak assigned to the pseudoboehmite exhibits almost the same shift, in the case of the Example 13 sample (pseudoboehmite-sodium thiosulfate pentahydrate-ZnO). Furthermore, the peak position of the sample obtained by removing sodium thiosulfate pentahydrate from the treating agent (i.e. residual pseudoboehmite) is almost the same as that of pseudoboehmite itself. From this, it is presumed that the sodium thiosulfate pentahydrate is reversibly adsorbed on the pseudoboehmite and this induces structural distortion of the pseudoboehmite.

As can be seen from the XRD results of FIG. 1, the sodium thiosulfate pentahydrate forms crystals by itself, but when it is loaded on pseudoboehmite, no peaks assigned to the crystal thereof are observed. From this, it is presumed that owing to the interaction with pseudoboehmite, the sodium thiosulfate pentahydrate is strongly adsorbed thereon and exists in an amorphous state. It is suggested that such sodium thiosulfate pentahydrate in an amorphous state bears destabilized hydration water, and thus accelerates the reduction of a halogen gas.

Analysis Example 3

The samples of Example 2 and Example 13 were subjected to the evaluation of chlorine removing ability, and the acid content in each sample after the treatment was then measured. The measurement was carried out by a method in which the sample, having been subjected to the evaluation of chlorine removing ability, was ground using a pestle and mortar, then 0.1 g of the resulting ground powder was dispersed in 10.0 ml of pure water, and subsequently, the pH of the supernatant solution was examined using a pH test paper (manufactured by MACHERY-NAGEL). As a result of this measurement, Example 2 exhibited pH 1, and Example 13 exhibited pH 6. From this, it has been presumed that, in Example 2 not comprising the inorganic compound, acid components (hydrogen chloride and/or sulfuric acid) were adsorbed on the pseudoboehmite having been subjected to the chlorine removing test. Further, it has been presumed that, in Example 13 comprising the inorganic compound (zinc oxide), the acid components (hydrogen chloride and/or sulfuric acid) formed were neutralized with zinc oxide.

Analysis Example 4

The samples of Example 13 and Example 17 were subjected to the measurement of total pore volume and the pore distribution measurement by mercury porosimetry. Further, samples obtained by the same formulations and the same production processes were subjected to the evaluation of chorine removing ability at 25° C., and the results are set forth in Table 4. The pore distributions of both samples are shown in FIG. 4, and were compared.

The chlorine removing ability of the sample of Example 17 obtained by using a plunger extruder increased by nearly 30%, compared to Example 13 obtained by using a disc pelleter. The reason for this has been understood as follows. Although there was no large difference in the total pore volume between those examples, a marked difference in the total pore volume of large pores having diameters of 10 nm or more was observed. Since the pressure applied by the plunger extruder during shaping was lower than that by the disc pelleter, the pores of the removing agent obtained with the plunger extruder are not easily broken, even though said removing agent had the same chemical composition as that obtained with the disc pelleter, so that, in the former, large pores remain, and these large pores contribute to the diffusion of chlorine gas into the inside of the removing agent shaped body and to the subsequent reductive decomposition.

TABLE 5

Difference in removing performance based on shaping method

| Ex. | Shaping machine | Total pore volume Diameter 3.0-500 nm | Total pore volume Diameter 10-500 nm | Tap density | Chlorine removing ability |
|---|---|---|---|---|---|
| Ex. 13 | disc pelleter (D) | 0.18 ml/g | 0.04 ml/g | 0.98 g/ml | 31 L/kg |
| Ex. 17 | plunger extruder (P) | 0.21 ml/g | 0.17 ml/g | 0.96 g/ml | 39 L/kg |

From the above results, the following considerations can be made.

(1) A removing agent only comprising thiosulfate pentahydrate, but not comprising pseudoboehmite, exhibited no halogen removing performance (Comparative Example 1).

(2) A removing agent only comprising pseudoboehmite, but not comprising thiosulfate pentahydrate, exhibited an extremely low removing performance (Reference Example 1), but removing agents comprising the combination of pseudoboehmite and thiosulfate pentahydrate exhibited a high removing performance owing to their synergistic effect (Examples 1 to 3). However, when the removing agent of Example 2 was dried at a temperature of 150° C., the resulting removing agent exhibited a markedly lower removing performance (Example 5). It is considered that the elimination of hydration water in thiosulfate pentahydrate rapidly proceeds at 60 to 100° C. and that thiosulfates are not decomposed even at 200° C., and therefore, the hydration water in the thiosulfate is deeply involved in the halogen decomposition.

(3) The removing agent achieved the highest removing ability when the percentage composition by weight of the thiosulfate pentahydrate therein, based on the content of the sulfur atom, was about 5% by weight; and in both cases where said percentage composition by weight was higher than that and where it was lower, the removing ability tended to decrease (Examples 1 to 3).

(4) Magnesium hydroxide, magnesium carbonate, calcium carbonate, goethite, zinc carbonate and zinc oxide, as the third component, exhibited high effects of improving the activity (Examples 6 to 17). Zinc carbonate and zinc oxide also exhibited effects to suppress breakthrough of sulfurous acid gas (Examples 10 to 17). In the case of using host materials other than pseudoboehmite, the effects due to these inorganic compounds were not exhibited (Comparative Examples 3 to 5), and it has been suggested that the pseudoboehmite acts as an essential element.

(5) When the method for shaping the removing agent was changed from a method with a disc pelleter to that with a plunger extruder which applies a low shaping pressure in order to change the removing agent structure, the removing ability of the resulting removing agent was remarkably improved (Table 4, Example 17). It has been found that a larger ratio of the total pore volume of large pores having diameters of 10 nm or more, relative to the total pore volume of the removing agent, improves the removing ability. This indicates that spaces favorable for the rapid reaction of pseudoboehmite, thiosulfate pentahydrate and a halogen gas are necessary.

(6) It is presumed that the reaction of a halogen-based gas with a thiosulfate is not a simple reduction reaction in a homogeneous field, and that the reaction proceeds on pseudoboehmite under the interaction between the pseudoboehmite and the thiosulfate, while e.g. the hydration water of sodium thiosulfate pentahydrate in an amorphous state is supplied thereto.

(7) When sodium oxalate was used as a reducing agent instead of a thiosulfate (Comparative Example 6), the chlorine removing ability was markedly lower. This indicates that there are optimum values for oxidation-reduction potential, etc. of the reducing agent; or other factors are present.

(8) In Example 2, $SO_2$ began to pass through the removing agent at the beginning of the treatment, then hydrogen chloride broke through, and chlorine gas was detected after 20 L/kg of said gas was treated with the removing agent. If an alkali agent such as quicklime column is connected to the removing agent of Example 2, leakage of harmful acidic gases such as $SO_2$ and hydrogen chloride can be prevented until the ability of the halogen gas removing agent is used up.

The invention claimed is:

1. A halogen gas removing agent comprising at least pseudoboehmite and a sulfur-containing reducing agent, wherein the pseudoboehmite is in an amount of 40% by weight or more, based on the total weight of the halogen gas removing agent.

2. The halogen gas removing agent according to claim 1, wherein the sulfur-containing reducing agent is in an amount of from 1 to 8% by weight in terms of the sulfur element in the sulfur-containing reducing agent, based on the total weight of the pseudoboehmite and the sulfur-containing reducing agent.

3. The halogen gas removing agent according to claim 1, wherein the sulfur-containing reducing agent is selected from the group consisting of thiosulfates, sulfites, dithionites and tetrathionates.

4. The halogen gas removing agent according to claim 3, wherein the sulfur-containing reducing agent comprises a salt hydrate.

5. The halogen gas removing agent according to claim 1, further comprising at least one inorganic compound selected from the group consisting of metal oxides, metal hydroxides, metal carbonates and metal hydrogen carbonates.

6. The halogen gas removing agent according to claim 5, wherein the metal of the at least one inorganic compound is selected from the group consisting of an alkaline earth metal element, a transition metal element and a zinc group element.

7. The halogen gas removing agent according to claim 5, wherein the at least one inorganic compound is from 1% by weight to 40% by weight, based on the total weight of the halogen gas removing agent.

8. The halogen gas removing agent according to claim 5, wherein the at least one inorganic compound is selected from the group consisting of magnesium hydroxide, magnesium carbonate, calcium carbonate, goethite, zinc carbonate and zinc oxide.

9. The halogen gas removing agent according to claim 5, wherein the compositional ratio by weight among the pseudoboehmite, the sulfur-containing reducing agent and the at least one inorganic compound is from 40 to 98:1 to 25:1 to 40 when the total weight of the pseudoboehmite, the sulfur-containing reducing agent and the at least one inorganic compound is 100.

10. The halogen gas removing agent according to claim 5, wherein the total weight of the pseudoboehmite, the sulfur-containing reducing agent and the at least one inorganic compound is from 90 to 100% by weight, based on the total weight of the halogen gas removing agent.

11. The halogen gas removing agent according to claim 1, wherein the 020 diffraction peak assigned to the pseudoboehmite, given by the XRD measurement of said removing agent using Cu Kα radiation, is shifted to the higher angle side as compared to the corresponding peak given by the measurement of pseudoboehmite alone.

12. The halogen gas removing agent according to claim 1, wherein a total pore volume of pores of the halogen gas removing agent having diameters of from 3.0 nm to 500 nm, as measured by mercury porosimetry, is from 0.05 ml/g to 1 ml/g.

13. The halogen gas removing agent according to claim 12, wherein a total pore volume of pores of the halogen gas removing agent having diameters of 10 nm to 500 nm, relative to the total pore volume of pores having diameters of 3.0 nm to 500 nm, as measured by mercury porosimetry, is 10% or more.

14. The halogen gas removing agent according to claim 1, wherein the sulfur-containing reducing agent comprises a thiosulfate in an amorphous state.

15. The halogen gas removing agent according to claim 1, wherein the sulfur-containing reducing agent comprises a thiosulfate pentahydrate.

16. A method for producing a halogen gas removing agent, comprising the steps of:
mixing and/or kneading pseudoboehmite, a sulfur-containing reducing agent and a dispersion medium, wherein the amount of the pseudoboehmite is in an amount of 40% by weight or more, based on the total weight of the halogen gas removing agent,
then shaping the mixture,
followed by drying.

17. The process according to claim 16, wherein the drying is carried out at a temperature from 30 to 90° C.

18. A halogen gas removing system, comprising the halogen gas removing agent according to claim 1, an absorbent of hydrogen halide and $SO_2$, wherein the adsorbent is connected to an end of said halogen gas removing agent.

19. The halogen gas removing system according to claim 18, wherein the adsorbent of hydrogen halide comprises at least one material selected from the group consisting of quick lime, slaked lime and zeolite.

* * * * *